Figure 8:
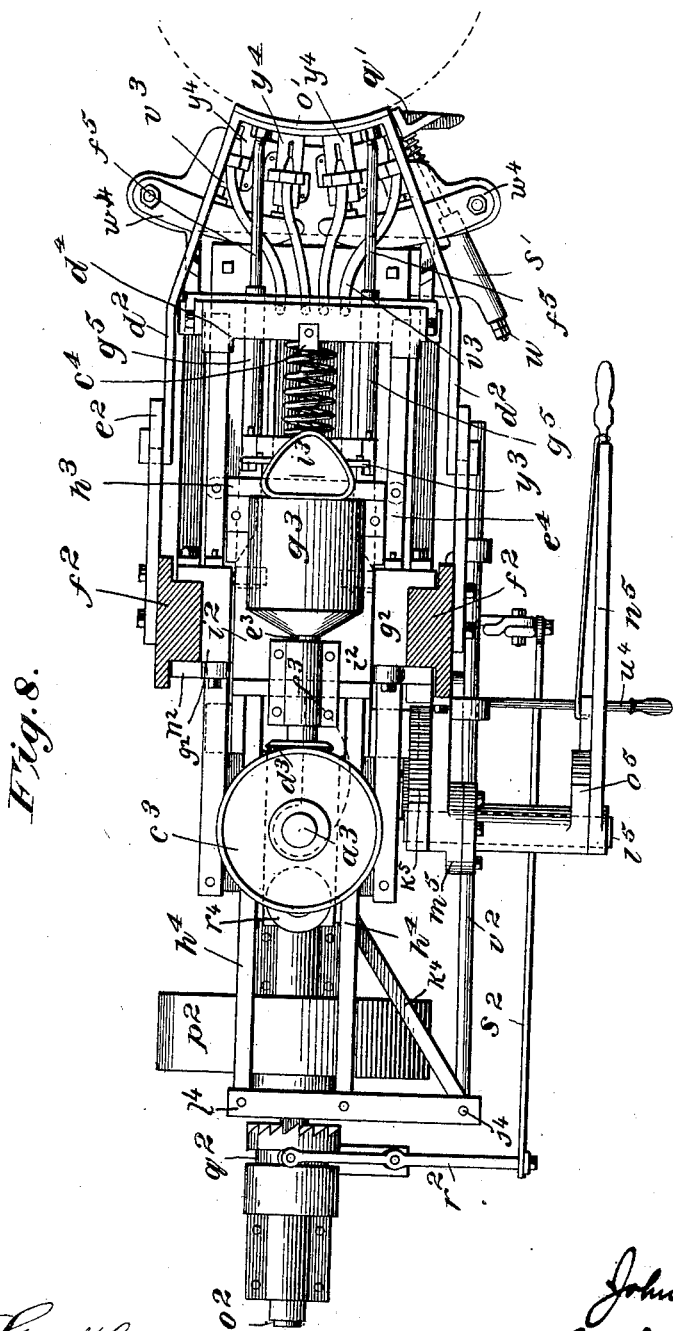

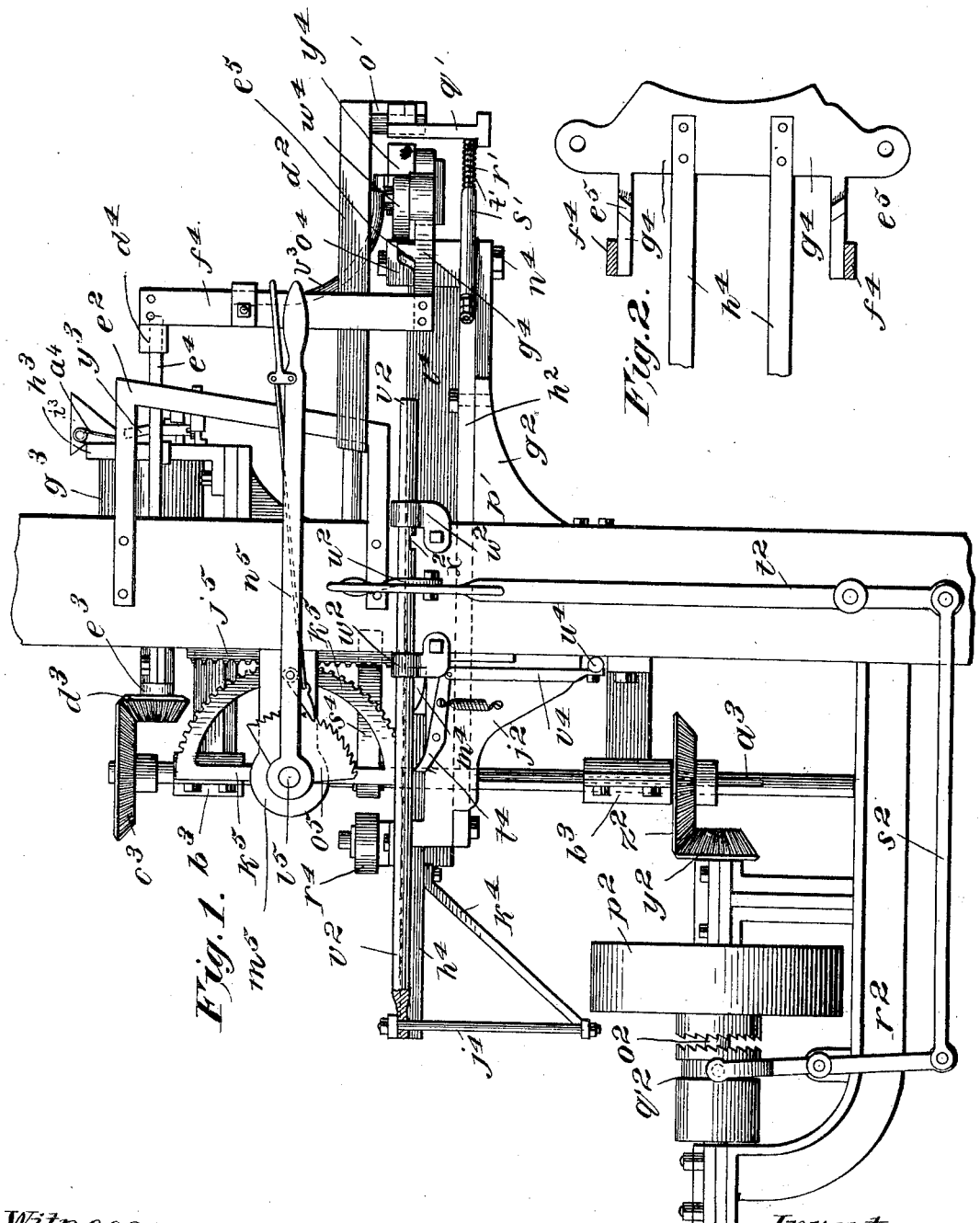

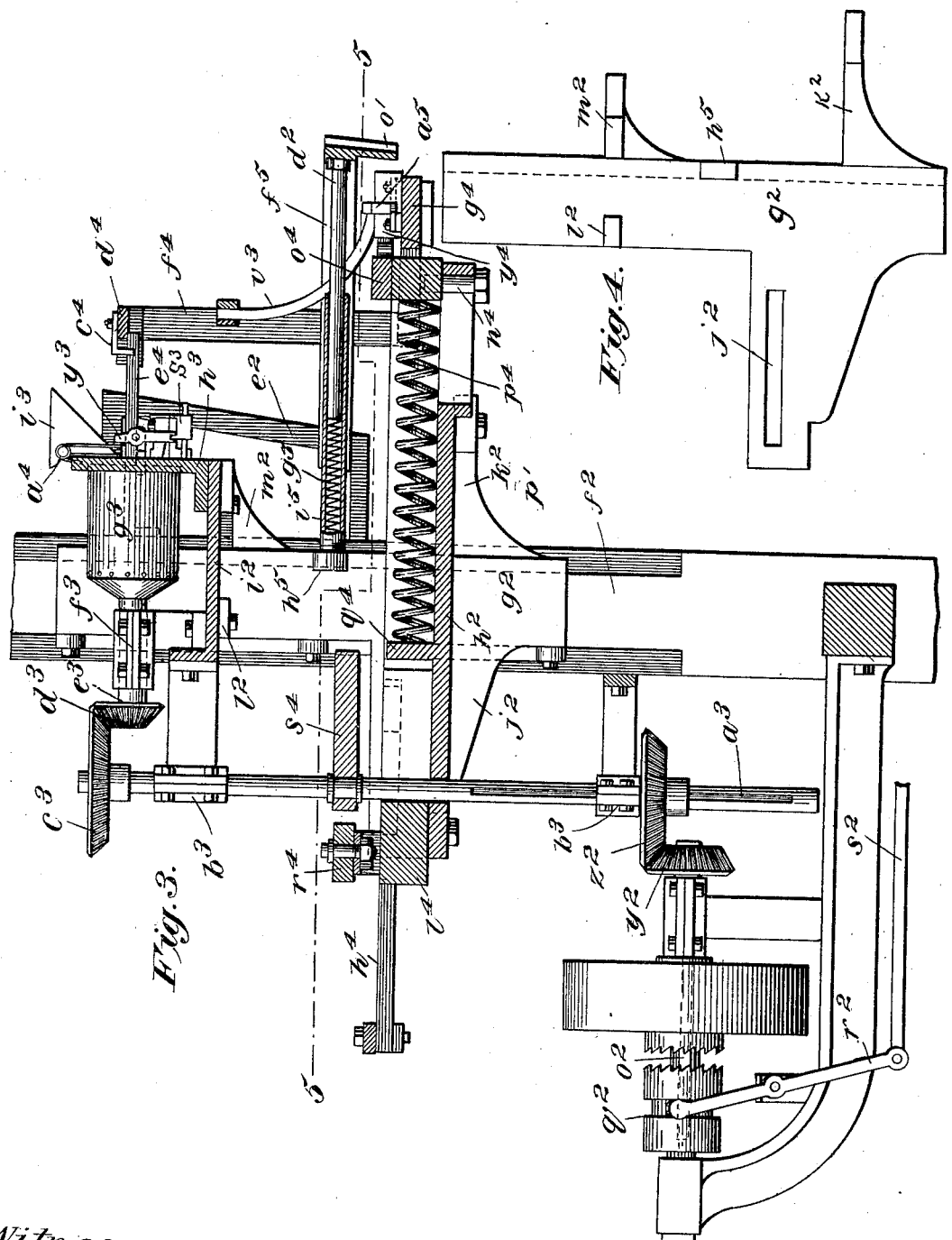

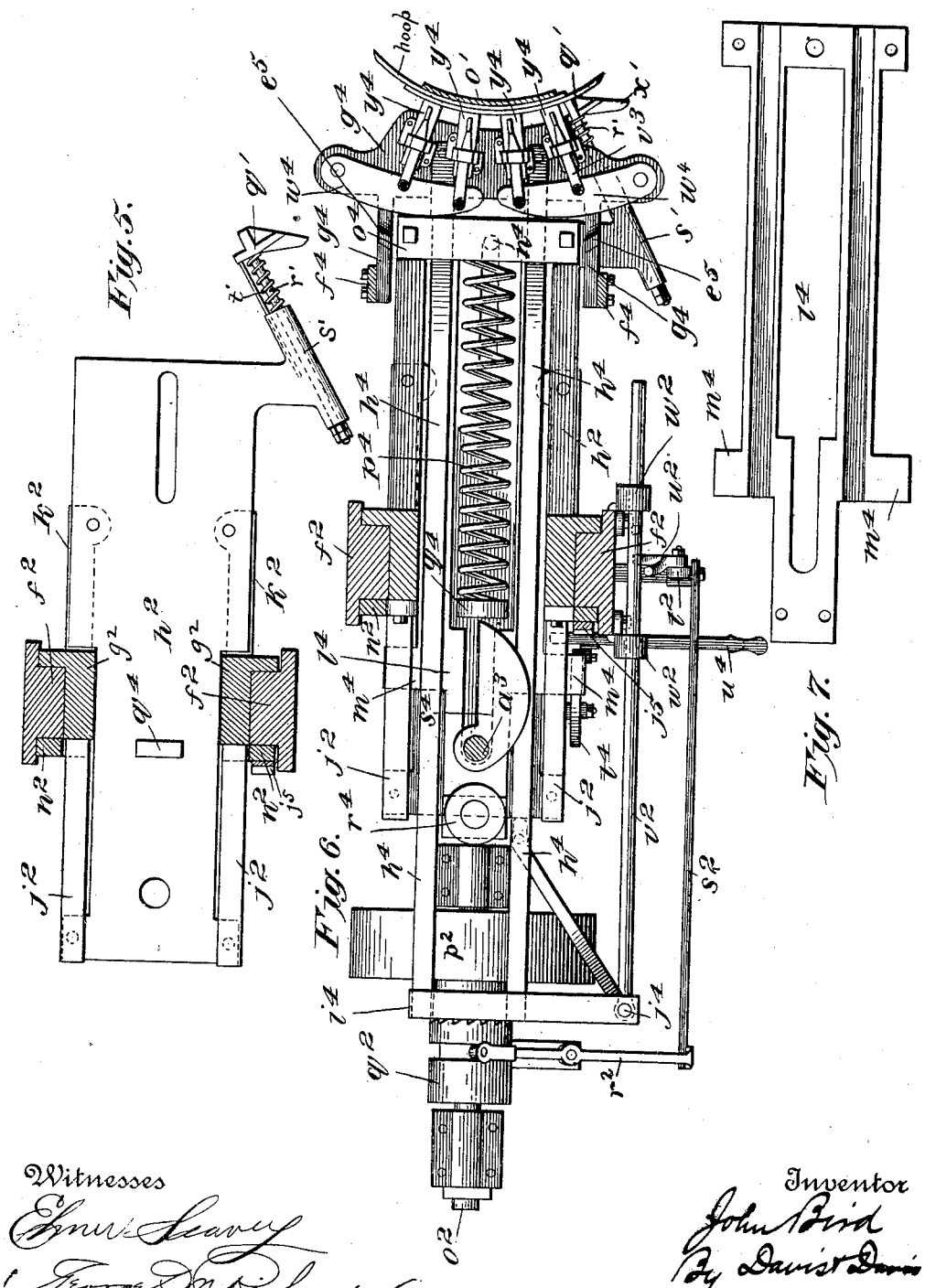

No. 668,846. Patented Feb. 26, 1901.
J. BIRD.
NAILING MACHINE.
(Application filed May 1, 1900.)
(No Model.) 6 Sheets—Sheet 4.

Witnesses
Inventor
John Bird
By Davis & Davis
Attorneys

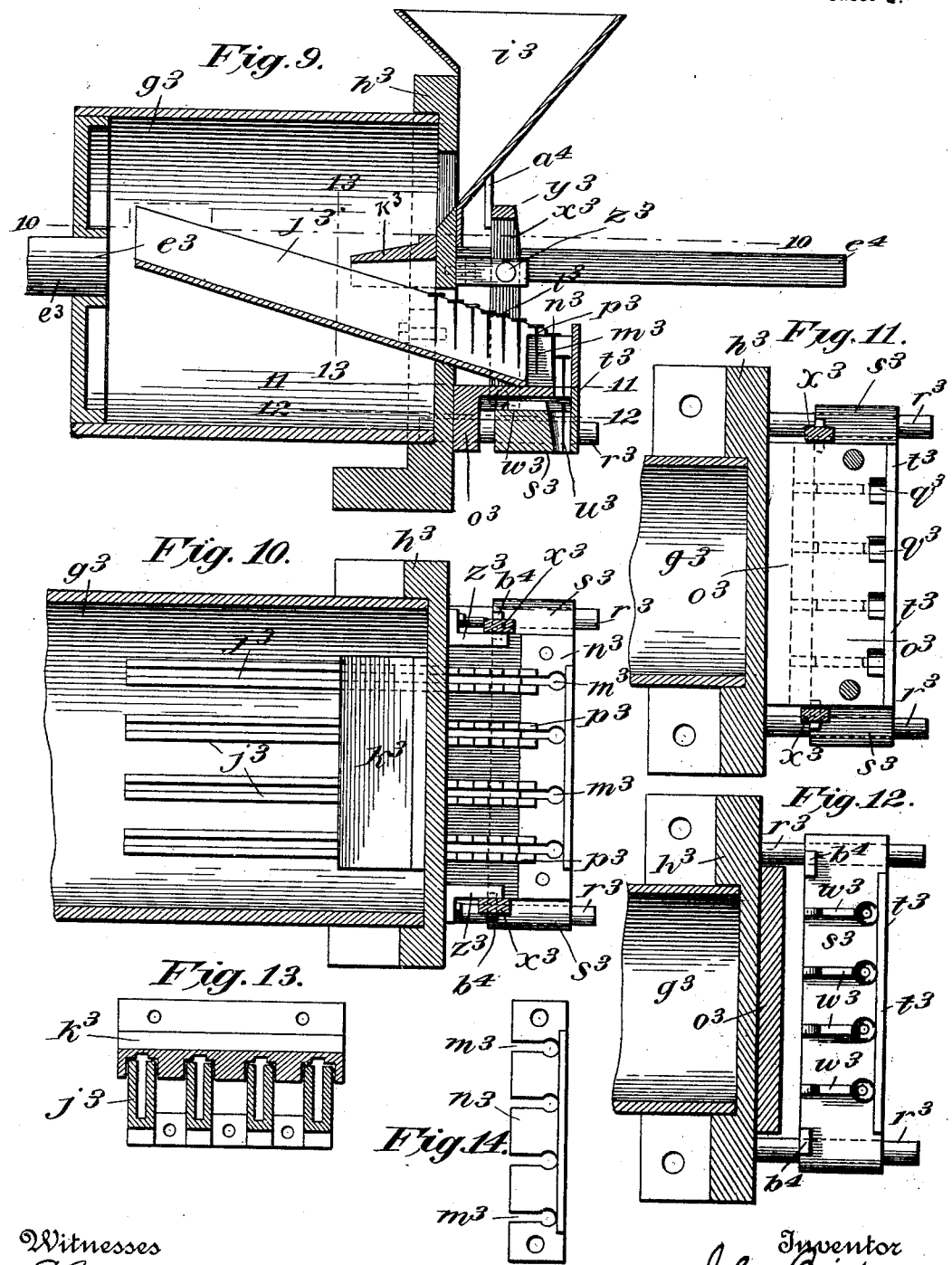

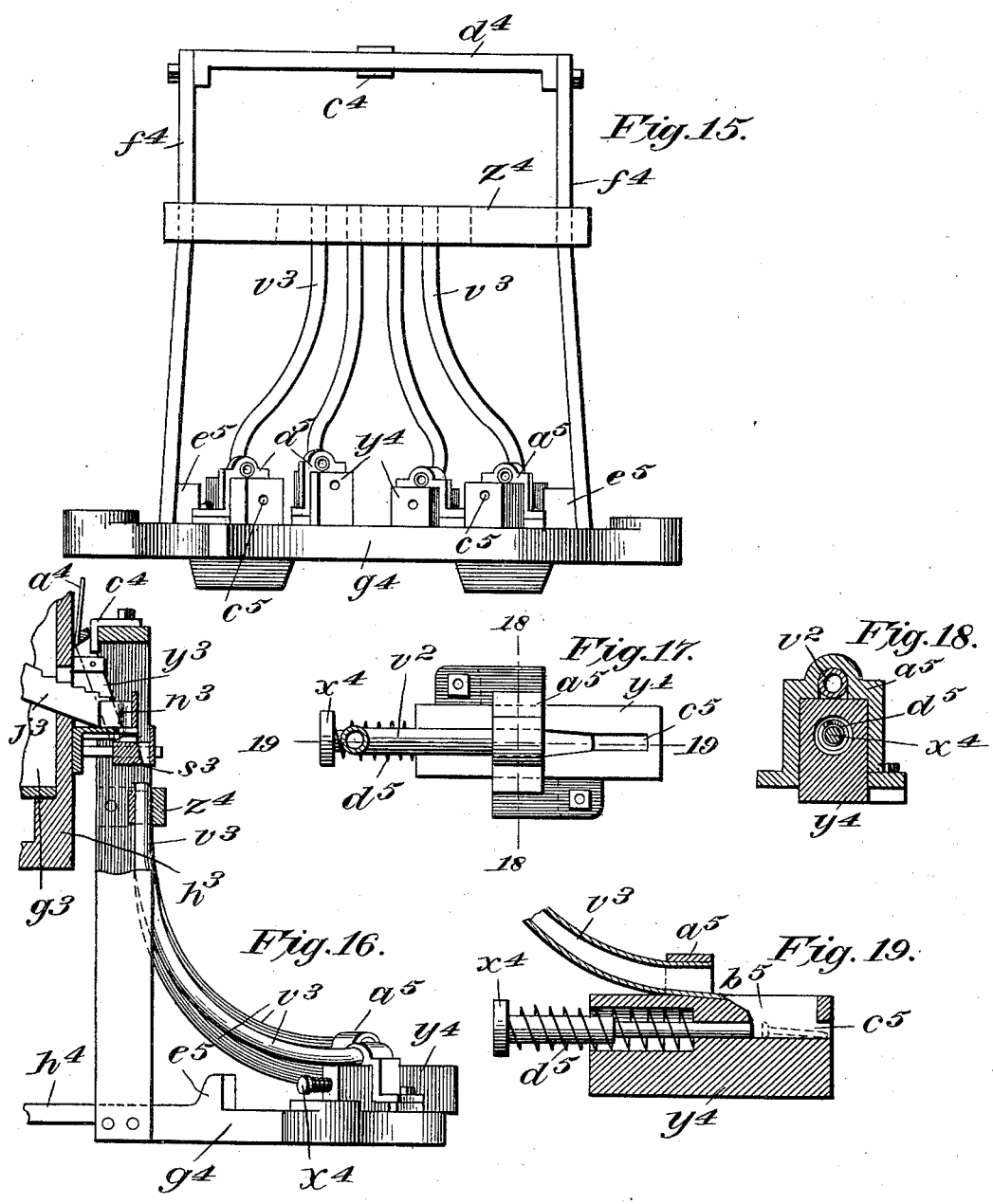

UNITED STATES PATENT OFFICE.

JOHN BIRD, OF ROCKLAND, MAINE.

NAILING-MACHINE.

SPECIFICATION forming part of Letters Patent No. 668,846, dated February 26, 1901.

Original application filed December 6, 1899, Serial No. 739,369. Divided and this application filed May 1, 1900. Serial No. 15,087. (No model.)

*To all whom it may concern:*

Be it known that I, JOHN BIRD, a citizen of the United States, residing at Rockland, county of Knox, and State of Maine, have invented certain new and useful Improvements in Nailing-Machines, of which the following is a specification, reference being had to the accompanying drawings, in which—

Figure 1 is a side elevation of the apparatus complete; Fig. 2, a detail plan view of a part of the supplemental carriage carrying the nail-holding devices, the uprights $f^4$ thereof being in section; Fig. 3, a vertical sectional view of the apparatus complete; Fig. 4, a detail showing the inner face of one of the side plates of the main carriage; Fig. 5, a plan view of the base-plate of the main carriage, the side plates and the supporting-posts being shown in section; Fig. 6, a horizontal section on the line 5 5 of Fig. 3; Fig. 7, a detail plan view of the hammer; Fig. 8, a plan view of the nailing mechanism; Fig. 9, a vertical sectional view of the nail feeding and delivery devices; Fig. 10, a horizontal section taken on the line 10 10 of Fig. 9; Fig. 11, a horizontal section on the line 11 11 of Fig. 9; Fig. 12, a horizontal section on the line 12 12 of Fig. 9; Fig. 13, a cross-section taken on the line 13 13 of Fig. 9; Fig. 14, a detail plan view of the block $n^3$ of the nail-feeding devices; Fig. 15, a detail front elevation of the supplemental carriage carrying the nail-holding and nail-driving devices; Fig. 16, a side elevation of the same, partly in section, showing the adjacent parts of the nail-feeding and nail-delivery devices; Figs. 17, 18, and 19, detail views of one of the nail-holding blocks and its driving-pin.

It is the object of this invention to provide simple automatic mechanism for feeding and driving nails into the overlapping ends of a barrel-hoop, the hoop having been previously wound around the barrel and its ends brought to an overlapped position adjacent to the machine by the mechanism described and shown in my application for patent, Serial No. 739,369, filed December 6, 1899, of which former application this is a division. It is obvious, however, that my invention is not limited to use in conjunction with the barrel hooping and heading machine described in my former application, since many combinations herein claimed are capable of use independently thereof.

In the present instance this mechanism comprises a carriage vertically adjusted on its supporting-posts to adapt it to be raised or lowered to bring the nailing devices to the proper point with respect to the overlapped ends of the hoop to be nailed, and a supplemental carriage supported by the main carriage and adapted to be slid inward close to the overlapped ends of the hoop at the moment of driving the nails, and suitable novel nail feeding, delivering, and driving devices, as more fully hereinafter set forth.

The main carriage $p'$ is comprised of two side plates $g^2$, connected by horizontal plates $h^2$ and $i^2$. Each side plate $g^2$ has an outward-extending bracket $j^2$ near its lower end and an inward-extending bracket $k^2$ at its inner edge, and the lower plate $h^2$ is bolted rigidly to these brackets. On a lateral extension of the inner end of this plate $h^2$ a tube or sleeve $s'$ is formed, which tube receives a horizontal rod $r'$ of the hoop-presser $q'$, said rod $r'$ working through said tube and the tube and rod being arranged radially with respect to the barrel-support, which latter is not shown in this application. Said rod $r'$ is normally pressed inward toward the barrel by a coil-spring $t'$, so that the hoop-presser exerts a constant pressure upon the overlapped ends of the hoop and keeps it pressed closely against the clencher-plate $o'$ during the act of nailing. This hoop-presser also serves to keep the hoop pressed against the barrel during the act of winding it thereon; but this feature is not fully illustrated in this application, as it is made the subject-matter of claims in my former application above mentioned.

The upper plate $i^2$ is supported rigidly on lugs $l^2$ and on inward-extending brackets $m^2$. The side plates $g^2$ are vertically grooved to fit suitable vertical ways on the frame-posts $f^2$, so that the carriage may slide vertically on the posts. The carriage is secured removably to the posts by means of plates $n^2$, bolted to the side plates of the carriage and extending outward over the side edges of the guide-ways on the posts.

The drive-shaft $o^2$ is provided with a drivepulley $p^2$ and a clutch $q^2$, which latter is thrown into and out of gear by means of a lever $r^2$, connected by a rod $s^2$ to a vertical hand-lever $t^2$, pivoted on the outside of one of the posts $f^2$ and extending upward to near the base-plate $h^2$ of the carriage. Pivoted on the upper end of lever $t^2$ is a pawl or latch-lever $u^2$, one arm of which extends upward alongside the upper or handle end of lever $t^2$ and the other arm of which extends inward under a slidable rod $v^2$, mounted in bearings $w^2$ on the posts $f^2$, said rod lying parallel to the base-plate of the carriage and being provided with a notch $x^2$ on its under side at a point between said bearings $w^2$. The inward-extending arm of pawl $u^2$ normally remains out of engagement with notch $x^2$; but when the operator grasps the handle of $t^2$ and the upper arm of pawl $u^2$ the inward-extending arm of lever $u^2$ is raised and held against the under side of rod $v^2$, and by moving said lever $t^2$ on its pivot said inward-extending arm may be made to engage in notch $x^2$, locking the rod to said lever and enabling it to be shifted back and forth with the lever. It will also be observed that by shifting lever $t^2$ inward—i. e., toward the hoop to be nailed—the clutch $q^2$ will be thrown into engagement and by shifting it away from the hoop the clutch will be disengaged.

The drive-shaft $o^2$ carries a bevel-pinion $y^2$, which meshes with a bevel-gear $z^2$, supported slidingly upon a vertical shaft $a^3$, journaled in bearings $b^3$, bolted one to the main frame and the other to the main carriage, said shaft $a^3$ extending up through an opening in the outer end of the base-plate $h^2$ and having secured to its upper extremity a bevel-gear $c^3$, meshing with a bevel-gear $d^3$ on a short shaft $e^3$, journaled in a bearing $f^3$, mounted on the upper plate $i^2$. The gear $z^2$ is supported entirely on pinion $y^2$, and shaft $a^3$ is slidable through it by reason of a spline-and-feather connection therewith. The shaft $a^3$ is vertically slidable in the lower one of its bearings $b^3$, this lower bearing being secured to the adjacent post $f^2$ of the frame. The upper bearing $b^3$ is rigidly connected to the outer edge of plate $i^2$ and is therefore movable vertical with the carriage. It will therefore be observed that the shaft $a^3$ moves vertically with the carriage, but does not carry with it the gear $z^2$, this gear being allowed to rest in engagement with pinion $y^2$.

To the inner end of shaft $e^3$ is secured the closed end of a cylinder $g^3$, whose inner open end fits within a flanged head-plate $h^3$, bolted rigidly to the plate $i^2$ of the carriage. The nails are fed into cylinder $g^3$ through an opening in the head $h^3$ by means of a hopper $i^3$, and the nails are fed out of this cylinder by means of grooved rails or troughs $j^3$, supported upon head $h^3$ and extending outward through openings in the same at a point below the hopper, these troughs $j^3$ inclining downward toward their discharge ends. There are four of these troughs or channels shown; but it is evident that a greater or less number may be employed, if desired. A guard-plate $k^3$ is secured to the inner side of head-plate $h^3$ and grooved to fit down over the channels $j^3$, whereby the nails as they are fed into the cylinder through hopper $i^3$ will be prevented from falling directly into said channels and thereby clogging them. The nails are delivered into these channels by the rotation of cylinder $g^3$, the speed of this cylinder being just sufficient to carry the nails around by centrifugal force and drop them into the channels. Only a few of the nails carried up and dropped fall into the channels; but enough fall into them to keep them full. The channels are of a width and depth to receive the body of the nail and suspend it within the channel by its head, as shown in Fig. 17. As the nails drop into the channels they will be fed downward and outward by gravity, the jar of the machinery being sufficient to insure the nails sliding down the channels. The upper edges of the lower ends of the channel are stepped at $l^3$, so that each channel will discharge its nails one by one, the steps being only of sufficient width to receive one nail at a time. The lower ends of the channels $j^3$ terminate, respectively, adjacent to the open ends of vertical slots $m^3$, formed in a block $n^3$, supported upon a rigid bracket-plate $o^3$, bolted to the face of the head $h^3$ below the ends of the channels $j^3$. The slots $m^3$ form, in effect, continuations of the channels, and at their inner ends they are enlarged to permit the heads of the nails to pass, so that when the nails reach the enlarged ends of the slots they drop vertically therethrough. The lower end of each channel is provided with a lip $p^3$, which forms one of the steps $l^3$ and extends out over the upper edge of block $n^3$ in order to carry the nails to or nearly to the enlarged portions of slots $m^3$ before discharging them. As the nails drop through the enlarged ends of slots $m^3$ they fall into flanged notches $q^3$, formed in the outer edge of plate $o^3$, these notches being approximately of the form of a dovetail and being adapted to let the body portions of the nails pass through them, but to catch and suspend the nails by their heads. Supported below plate $o^3$ upon rods $r^3$, projecting from head-plate $h^3$, is a sliding block $s^3$, which is provided with an upward-extending flange $t^3$, fitting against the outer edge of plate $o^3$ and closing the notches $q^3$. Coincident with notches $q^3$ the block $s^3$ is provided with vertical holes $u^3$, through which the nails may drop vertically into the delivery-tubes $v^3$, hereinafter described. Upon the upper face of slide-block $s^3$ is formed a series of ribs $w^3$, which work in grooves in the bottom of plate $o^3$, these grooves being coincident with notches $q^3$, whereby when block $s^3$ is slid outward on its rods $r^3$ these ribs will push the nails out of the notches and permit them to fall through passage $u^3$ into the tubes $v^3$, the flange $t^3$ moving away from the notches as the block moves, and thereby opening the notches sufficiently to permit the nails to be pushed out of them. It will be observed that the nails remain upright while passing through the channels $j^3$, block $n^3$, plate $o^3$, and slide $s^3$, so that if the block $n^3$ be deep enough the nails will rest end on end in the enlarged passages through said block; but I prefer that block $n^3$ be just deep enough to receive one nail at a time. It will also be observed that there can be no clogging of nails in the passages, as the nails can only feed one by one from each channel, the nail or nails in passages in block $n^3$ preventing others being delivered from channels, as shown. With each reciprocation of slide-block $s^3$ four nails will be discharged into the delivery-tubes below, and no nails can drop into notches $q^3$ until said slide is pushed back.

The slide $s^3$ is operated by the depending side arms $x^3$ of a yoke $y^3$, these depending arms being pivoted to brackets $z^3$, bolted to head $h^3$ upon opposite sides of the channels $j^3$, the bars connecting these depending arms lying across the head $h^3$ at a suitable point below the hopper $i^3$ and being normally pressed outward away from head $h^3$ by means of a spring $a^4$, secured to the upper edge of said head $h^3$. The lower ends of arms $x^3$ pivotally engage over lugs $b^4$ on said slide $s^3$, so that the slide will be normally drawn in under plate $o^3$, but may be forced outward therefrom by pressing the upper end of yoke $y^3$ toward head $h^3$.

The yoke $y^3$ is tripped by means of a finger $c^4$, secured to the upper cross-bar $d^4$ of the supplemental carriage, the upper part of this carriage being steadied and guided by a pair of rods $e^4$, projecting from the side edges of the main carriage, said carriage consisting, essentially, of said bar $d^4$, vertical side bars $f^4$, and a base-plate $g^4$, the front edge of the base-plate being curved to correspond to the curvature of the clencher-plate, near the lower edge of which said curved front edge lies. This supplemental carriage is supported by said rods $e^4$ and by a frame composed of another pair of longer rods $h^4$, which extend outward between the two posts $f^2$ and are connected rigidly together at their outer extremities by means of a transverse bar $i^4$, one end of which extends outward laterally and carries at its extended end a depending rod $j^4$, the lower end of which is braced to the adjacent rod $h^4$ by means of an inclined brace $k^4$. This rod $j^4$ passes loosely through a hole in the outer end of rod $v^2$, this sliding connection permitting rod $j^4$ and its attached parts to move vertically without disturbing the adjustment of rod $v^2$, but at the same time preventing one being adjusted horizontally without a corresponding movement of the other. It will thus be observed that by adjusting rod $v^2$ endwise in its bearings the frame $h^4$ may be adjusted forward or backward and that the main carriage may be vertically adjusted without disturbing the connection between the adjusting-rod $v^2$ and said supplemental-carriage frame.

The rods $h^4$ rest and work in long grooves in the upper face of a hammer-plate $l^4$, (shown in detail in Fig. 7,) which is supported slidingly upon base-plate $h^2$, being guided thereon by lateral lugs $m^4$, working in slots in side brackets $j^2$, and by a bolt $n^4$, depending from its forward end and working in a slot in the base-plate $h^2$. Secured across the inward or forward end of this hammer-plate is a bar $o^4$, which confines rods $h^4$ in their grooves. This hammer frame or plate is centrally slotted for the passage of shaft $a^3$ and the reception of its actuating-spring $p^4$, which bears against a lug $q^4$ at one end (said lug being formed on the base-plate $h^2$) and against the inner end of the slot, thereby normally pressing the hammer-plate inward toward the supplemental carriage. A roller $r^4$ is journaled upon the hammer-plate at its outer end, and adapted to contact with said roller is a cam $s^4$, arranged horizontally upon shaft $a^3$, so that upon the rotation of said shaft the cam will engage roller $r^4$ and force out the hammer $l^4$. To hold the hammer out when it is pressed out by said cam, a spring-actuated pawl $t^4$ is pivoted on one of the brackets $j^2$ and normally held up in the path of the extended end of one of lugs $m^4$, the lower side of this lug being beveled, as shown in Fig. 1, to facilitate its passage over the pawl on the outward movement of the hammer. The pawl is disengaged from lug $m^4$ at the proper moment by the hand of the attendant, a lever $u^4$, pivoted on one of the posts $f^2$ and connected to said pawl by a link $v^4$, being employed to facilitate the operation of the pawl. When the hammer is locked by the pawl in the outer extremity of its movement, the cam $s^4$ may rotate without coming in contact with the roller $r^4$.

Pivoted upon the upper side of plate $g^4$ is a pair of hammer-levers $w^4$, which extend inward toward each other and lie in the path of the hammer $l^4$, so that said hammer when released strikes against the outer curved edges of these levers and forces their inner edges inward toward the clencher-plate $o'$. Each hammer-lever $w^4$ is adapted to strike two nail-driving pins $x^4$, each of which works in a block $y^4$, secured rigidly to base-plate $g^4$. These four blocks $y^4$ are arranged in the arc of a circle conforming to the curvature of the clencher-plate and the front edge of plate $g^4$, the forward ends of these blocks projecting beyond said curved edge of plate $g^4$, so that when the supplemental carriage is adjusted inward as far as it will go the forward ends of said blocks $y^4$ bear directly against the overlapped ends of the hoop. Connected to each block $y^4$ is one of the delivery-tubes $v^3$, these tubes being curved upward and having their upper open ends clamped to a bar $z^4$, secured across standards $f^4$ at such a height that when the supplemental frame is at the outer extremity of its movement the upper open ends of the tubes will register with the passages $u^3$ of the nail-feeding devices. The lower ends of tubes $v^3$ are secured to the blocks $y^4$ by clamps $a^5$, and each tube discharges its nails into an open recess $b^5$ in its block, this recess communicating with a passage $c^5$, through which the driving-pin $x^4$ works, so that upon each forward movement of the driving-pin the nail which has been dropped into said passage $c^5$ (and in which it lies in a horizontal position) will be driven forward out of passage $c^5$ into the overlapped ends of the hoop and clenched by plate $o'$. Each driving-pin $x^4$ is normally retracted by a suitable coil-spring $d^5$, confined on the pin between its headed outer end and the bottom of a recess formed in the outer end of the block $y^4$. These springs $d^5$ keep the pins pressed normally against the hammer-levers and the hammer-levers normally against lugs $e^5$ on the plate $g^4$.

It will be observed that the clencher-plate $o'$ is curved to fit against the barrel and is provided with a pair of outward-extending rods $f^5$, which work in open-ended tubes $g^5$, projecting forward from lugs $h^5$ on the side plates of the carriage, coil-springs $i^5$ being confined in said tubes $g^5$ to keep the clencher-plate normally pressed inward or forward. To limit the inward movement of the clencher-plate, its side arms $d^2$ are hooked at their outer ends and engage over guide-bars $e^2$, these bars $e^2$ being secured to the posts $f^2$ and inclined upward and inward, so that the movement of the clencher-plate will conform to the tops of the barrel when the main carriage is raised.

To vertically adjust the carriage to bring the nailing devices in line with the various hoops of the barrel, a rack $j^5$ is attached to one of the flanges $n^2$ of the carriage, and engaging in this rack is a toothed segment $k^5$, secured to a short rock-shaft $l^5$, journaled in a bracket $m^5$, bolted to the outer edge of one of the posts $f^2$, said shaft $l^5$ having secured to it an operating-lever $n^5$, carrying a pawl adapted to engage a ratchet-segment $o^5$, rigidly bolted to one side of the bearing $m^5$. By these devices the carrriage may be vertically adjusted and locked in its adjusted position.

Operation: A quantity of nails having been placed in cylinder $g^3$, the operator throws lever $t^2$ to the right, thereby rotating shaft $a^3$ and the nail-cylinder, causing the nails to be fed to the delivery devices in the manner described. The rotation of shaft $a^3$ causes cam $s^4$ to force back the hammer, which is locked in its outer position by pawl $t^4$. The supplemental carriage is now relieved of the pressure of the hammer, and it may be slid back under the nail-delivery devices, the act of drawing it back tripping yoke $y^3$ and delivering one nail into each of the tubes $v^3$, from which they pass into the nail-holders $y^4$. Then when the hoop is completely wound around the barrel the operator throws the carriage forward against the overlapped part of the hoop and then trips pawl $t^4$ and releases the hammer, whereupon the hammer moves forcibly inward and drives the nails. If additional blows are necessary to completely drive and clench the nails, the operator holds pawl $t^4$ down, whereby the cam $s^4$ will again bring back the hammer for another blow, said cam being straight on one side, so that the roller $r^4$ may move inward as soon as the point of the cam is passed. It is obvious that during the winding of the hoop the supplemental carriage, being free of the pressure of the hammer-spring, may be adjusted back out of the path of the hoop-carrier. It will be observed that whenever the supplemental carriage is moved inward against the hoop the nail-feeding cylinder will be operated, thus securing a constant supply of nails to the channels $j^3$; but it is obvious that by reason of the fact that lever $t^2$ may be moved independently of rod $v^2$ of the carriage the nail-feeding cylinder may be kept in operation the entire time during which the hoop is being wound, if desired. In fact, the only time the nail-cylinder is necessarily stopped is when lever $t^2$ is swung outward to bring the supplemental carriage under the delivery devices.

The shield $k^3$ in addition to being grooved or notched on its under side for the reception of the nail-channels is grooved coincidently with the channels down which the nails slide, as shown clearly in Fig. 13, whereby the heads of the nails may pass freely under the shield. This shield besides preventing the nails fed through the hopper from engorging the channels also prevents the nails that drop from the rotating cylinder interfering with the nails that are already placed in the channels and are in the act of passing out through head $h^3$.

It will be observed that this invention is not confined to the specific construction shown and described, and I therefore reserve the right to vary the same without departing from the scope of the claims. It will be obvious, for instance, that by slight changes in the nail feeding, delivering, and holding devices staples may be driven into the hoops instead of nails.

Having thus fully described my invention, what I claim, and desire to secure by Letters Patent, is—

1. In a mechanism for nailing barrel-hoops, &c., the combination of a support, a main carriage vertically slidable thereon, means for vertically adjusting the carriage and holding it in its adjusted positions, a supplemental carriage slidably mounted on the main carriage and adapted to be adjusted up to the work and away from the same, said carriage carrying nail-holding devices, a hammer on the main carriage for driving the nails, nail feeding and delivering devices on the main carriage, devices on the main carriage for operating the hammer and the nail-feeding devices, said devices being movable with the main carriage, and driving mechanism having constant connection with said hammer and feed-operating devices irrespective of the position of the carriage.

2. In a nailing-machine, the combination of a carriage and means for supporting the same, said carriage being adapted to be moved to and from the work to be nailed and carrying nail-holding and nail-driving devices, a hammer carried by the supporting means, and devices for operating the said hammer to drive the nails.

3. In a machine for nailing, the combination, of a support, a main carriage vertically adjustable thereon, means for adjusting this carriage and holding it in its adjusted positions, a supplemental carriage on the main carriage and adapted to be adjusted vertically therewith and horizontally independently thereof to bring it up to the work to be nailed, nail-holding and nail-driving devices on said supplemental carriage, nail-feeding devices on the main carriage, a hammer on the main carriage and stationary mechanism for driving the nail-feeding devices irrespective of the adjusted position of the main carriage.

4. In combination, a support, a main carriage vertically slidable thereon, a supplemental carriage slidable on the main carriage and adapted to be brought up to the work, nail-holding blocks on the supplemental carriage, driving-pins in these blocks, hammer-levers pivoted on the supplemental carriage and adapted to actuate the said driving-pins, a hammer on the main carriage adapted to actuate said hammer-levers when the supplemental carriage is adjusted up to the work to be nailed, and means for actuating the hammer and feeding the nails.

5. In combination, a support, a main carriage vertically adjustable thereon, means for holding this carriage in its adjusted positions, a clencher-plate carried by this main carriage and adapted to be adjusted vertically with it, a supplemental carriage slidable on the main carriage and adapted to be adjusted toward and from the clencher-plate, nail-holding devices on the supplemental carriage and tubes leading to said nail-holding devices, means for feeding the nails into the said tubes when the supplemental carriage is adjusted to and from the work, a hammer on the main carriage, a spring for imparting to the hammer the nail-driving stroke, means for drawing back the hammer from the work against the action of said spring, means for locking the hammer when drawn back and means for releasing it to drive the nails, and means whereby the nail-feeding devices are operated simultaneously with the drawing back of the hammer.

6. In combination, a movable clencher-plate and means for normally and resiliently holding it against the work, means for holding the parts to be nailed upon the clencher-plate, and a carriage adapted to be adjusted up against said parts and carrying nail-holding devices, and devices for driving the nails against the clencher-plate.

7. In combination, a clencher-plate provided with a pair of supporting-arms, inclined uprights, as $e^2$, slidingly engaging said supporting-arms, and means for normally holding said supporting-arms in engagement with said uprights, for the purpose set forth.

8. In a machine for nailing barrel-hoops, &c., the combination of a carriage carrying nail-holding tubes or blocks and adapted to be moved up against the work to be nailed, means for feeding nails to said tubes or blocks, a driving-pin in each tube or block, a hammer-lever on said carriage and adapted to drive said pins, means for normally withdrawing the pins after the nails are driven, a spring-actuated hammer adapted to strike said hammer-lever, a cam for withdrawing said hammer-lever after each operation, and devices for temporarily holding the hammer out of operation against the action of its spring.

9. In combination, a main carriage, means for vertically adjusting it, nail feeding, holding and driving devices supported on said carriage, a shaft journaled on said carriage and adapted to operate said devices, said shaft depending from said carriage, a gear slidably mounted on said shaft, a driving-pinion engaging and supporting said gear, and means for driving this pinion, substantially as and for the purpose set forth.

10. In combination, a vertically-adjustable carriage carrying nail-feeding and nail-holding and nail-driving devices, the nail-driving devices comprising driving-pins and a spring-actuated hammer, a vertical shaft carried by and depending from the carriage, gearing connecting this shaft to the nail-feeding devices, a device on the shaft for withdrawing the spring-actuated hammer, and driving-gearing having a sliding connection to said shaft whereby it may be driven in its various adjusted positions.

11. In combination a support, a vertically-adjustable carriage thereon, a supplemental carriage on the main carriage and adapted to be adjusted up to the work, a slidable frame supporting and guiding this latter carriage, a movable adjusting-rod $v^2$ on the support, this rod having a sliding connection with said frame, and nail feeding and holding and driving devices, substantially as set forth.

12. In combination, a support, a vertically-sliding carriage, carrying a laterally-slidable supplemental carriage, carrying nail-holding devices, a slidable frame connected to said supplemental carriage and carrying a vertical rod $j^4$, nail feeding and driving devices, a slidable adjusting-rod $v^2$ on the support, this rod having a sliding connection with said rod $j^4$, for the purpose set forth.

13. In combination, a support, a laterally-adjustable carriage thereon adapted to be moved to and from the work to be nailed, this carriage carrying nail-holding devices, means for delivering nails singly into said nail-holding devices, nail-driving devices, and a part carried by said carriage and adapted to contact with and automatically operate the nail-delivery devices when the carriage is adjusted back from its work and deliver nails singly to the nail-holding devices on said carriage, for the purpose set forth.

14. In combination, a supplemental carriage carrying nail-holding devices, this carriage being adapted to be adjusted up to the work, a support, a hammer slidable on said support, means for withdrawing and projecting this hammer, the frame of said carriage being slidingly supported on said hammer, and means for adjusting this frame.

15. In combination, a supporting-plate, a spring-actuated hammer longitudinally movable on said plate, devices for withdrawing and locking the hammer, a supplemental carriage slidingly supported on said hammer and carrying nail-holding devices, means for adjusting this carriage independently of the hammer up to the work, and nail-driving devices on the carriage in the path of the hammer, substantially as set forth.

16. In combination, a supporting base-plate, an adjustable carriage thereon carrying nail-holding devices, a spring-actuated hammer and means for withdrawing it, a spring-actuated pawl mounted on the support and adapted to normally engage a part of the hammer and hold the hammer out against the action of its spring, means for releasing said pawl and means for adjusting said carriage to and from the work independently of the releasing devices, for the purpose set forth.

17. In combination, a support, a carriage thereon adapted to be adjusted to and from the work or article to be nailed, nail-holding devices on said carriage, nail-driving devices, nail-feeding devices adapted to supply nails to said nail-holding devices on the carriage when the carriage is brought back away from the work, means for driving said nail-feeding devices, and means whereby the nail-feeding devices are stopped when the carriage is brought back to the limit of its movement away from the work.

18. In combination, a support, a carriage carrying nail-holding devices and adapted to be adjusted up to and away from the work, nail-driving devices, nail-feeding devices and driving mechanism therefor, and means whereby the driving mechanism of the nail-feeding devices, is stopped when the carriage is moved away from the work and is started when the carriage is moved up to the work.

19. In combination, a support, a carriage thereon adapted to be adjusted up to and away from the work and carrying nail-holding devices, nail-driving devices, nail-feeding devices and means for driving the same, means for delivering nails from these feeding devices to the nail-holders on the carriage, these delivery devices being automatically actuated when the carriage is moved away from the work, and means whereby the driving mechanism of the nail-feeding devices will be stopped when the carriage is moved away from the work and started when the carriage is moved up to the work, and means whereby the nail-feeding devices may be driven independently of the position of the said carriage.

20. In combination, a support, a nail-holding carriage adapted to be adjusted up to and away from the work, nail-driving devices, nail-delivery devices, means for feeding nails to said delivery devices, means for ejecting nails from the delivery devices into the nail-holders when the carriage is adjusted away from the work, an endwise-slidable rod $v^2$ connected to the carriage, a lever pivoted on the support and provided with a movable part adapted to be brought into engagement with said rod and move it when the lever is moved, and means whereby the movement of this lever in one direction will start the nail-feeding devices and in the other direction stop said devices, substantially as set forth.

21. In a nailing mechanism, the combination of a series of downward-inclined channels and means for placing nails therein, a stationary plate $o^3$ supported under the discharge ends of said channels and having its outer edge provided with open flanged notches, a stationary block $n^3$ supported on said plate and slotted vertically coincidently with said channels, these slots being enlarged vertically at one end, these enlarged portions being coincident with said flanged notches, a block slidably mounted under said plate $o^3$ and provided with a flange adapted to close said flanged notches and with upward projections working in grooves in the under side of said plate $o^3$, coincident with said notches, this sliding block being provided with vertical passages coincident with said notches, a pivoted spring-actuated yoke engaging said sliding block and holding it normally in under plate $o^3$, and a carriage carrying nail-holding devices adapted to receive the nails as they fall from the delivery devices, this carriage carrying a part adapted to trip said yoke and deliver the nails into said nail-holding devices.

22. In combination, a nail-channel adapted to suspend the nails by their heads and to feed them one by one, a block supported adjacent the discharge end of said channel and provided with a vertical slot to receive the nails singly, a nail-supporting plate adapted to receive and suspend the nails as they fall through said slot, and devices for delivering the nails from said plate, for the purpose set forth.

23. In combination, a nail-channel and means for filling the same, said channel being adapted to deliver the nails singly in a vertical position, a plate supported adjacent to the discharge end of said channel and adapted to receive and suspend the nails singly, and a sliding block adapted to discharge the nails singly from said plate, substantially as set forth.

24. In combination, a nail-channel adapted to feed nails singly in an upright position, a plate adjacent to the discharge end of said channel and adapted to receive and suspend the nails singly, a movable part adapted to eject the nails singly from said plate and simultaneously interrupt the passage of the succeeding nails thereto.

25. In combination, a nail-feeding channel, a receiving-plate provided with a suspending-notch, means for directing the nails successively into said notch, and a movable part adapted by its movement to eject the suspended nail from said notch and to close said notch, substantially as set forth.

26. In combination, a nail-suspending plate having a notch at one edge, a movable part adapted to close said notch at its edge in one position and at its bottom in another position, means for operating said part, and means for delivering nails singly to said notch, substantially as set forth.

27. In combination, a nail-suspending part and means for feeding nails singly thereto, a movable part normally holding the nails in said suspending part, a movable carriage carrying nail-holding devices, and means whereby the adjustment of said carriage automatically ejects the nails from said suspending part by the movement of said movable part.

28. In combination, a nail-suspending plate and means for feeding nails singly thereto, said plate being provided with a nail-suspending notch, a movable block underneath said plate and provided with a flange to close said notch and a nail-passage registering with said notch and a part adapted to close the bottom of said notch as each nail is ejected, substantially as set forth.

29. In combination, a plate provided with grooves and suspending-notches, at one edge, means for dropping nails vertically into said notches, a spring-actuated block provided with a flange normally closing said notches and with ribs working in said grooves in the suspending-plate, this block being provided with vertical passages coincident with said notches, and means for actuating said block to eject the nails from the notches.

In testimony whereof I hereunto affix my signature, in the presence of two witnesses, this 13th day of April, 1900.

JOHN BIRD.

Witnesses:
  E. F. BERRY,
  W. A. HOLMAN.